(12) United States Patent
Grogg et al.

(10) Patent No.: US 9,856,746 B2
(45) Date of Patent: Jan. 2, 2018

(54) HEATSHIELD DISCOURAGER SEAL FOR A GAS TURBINE ENGINE

(71) Applicant: UNITED TECHNOLOGIES CORPORATION, Hartford, CT (US)

(72) Inventors: Gary L Grogg, South Berwick, ME (US); Grace E Szymanski, Burlington, CT (US)

(73) Assignee: United Technologies Corporation, Farmington, CT (US)

( * ) Notice: Subject to any disclaimer, the term of this patent is extended or adjusted under 35 U.S.C. 154(b) by 164 days.

(21) Appl. No.: 14/774,931

(22) PCT Filed: Mar. 14, 2014

(86) PCT No.: PCT/US2014/026976
§ 371 (c)(1),
(2) Date: Sep. 11, 2015

(87) PCT Pub. No.: WO2014/152123
PCT Pub. Date: Sep. 25, 2014

(65) Prior Publication Data
US 2016/0032763 A1   Feb. 4, 2016

Related U.S. Application Data

(60) Provisional application No. 61/783,063, filed on Mar. 14, 2013.

(51) Int. Cl.
*F01D 25/08* (2006.01)
*F01D 25/16* (2006.01)
(Continued)

(52) U.S. Cl.
CPC ............. *F01D 25/08* (2013.01); *F01D 25/16* (2013.01); *F01D 25/162* (2013.01); *F01D 25/18* (2013.01);
(Continued)

(58) Field of Classification Search
CPC ........ F01D 25/08; F01D 25/16; F01D 25/162; F01D 25/18; F01D 25/183; F02C 7/06;
(Continued)

(56) References Cited

U.S. PATENT DOCUMENTS 2,963,857 A    12/1960  Egbert et al.
3,250,512 A *   5/1966  Petrie .................... F01D 25/125
                                                                415/135
(Continued)

FOREIGN PATENT DOCUMENTS

EP        1811132 A1    7/2007
GB         582082 A    11/1946
(Continued)

OTHER PUBLICATIONS

European Extended Search Report dated Oct. 18, 2016, issued in the corresponding European Patent Application No. 14768002.9.

*Primary Examiner* — Michael Riegelman
(74) *Attorney, Agent, or Firm* — Bachman & LaPointe, P.C.

(57) ABSTRACT

A gas turbine engine includes a service line interface that extends from an outer surface of a bearing support such that a heat shield is spaced from the outer surface. A method of mounting a heat shield to a gas turbine engine includes trapping a heat shield within a gapped overlap spaced from an outer surface of a bearing support.

18 Claims, 6 Drawing Sheets

(51) Int. Cl.
*F01D 25/18* (2006.01)
*F02C 7/06* (2006.01)
*F02C 7/24* (2006.01)

(52) U.S. Cl.
CPC .............. *F01D 25/183* (2013.01); *F02C 7/06* (2013.01); *F02C 7/24* (2013.01); *F05D 2220/32* (2013.01); *F05D 2240/50* (2013.01); *F05D 2260/231* (2013.01); *F05D 2260/602* (2013.01); *F05D 2260/98* (2013.01)

(58) Field of Classification Search
CPC .... F02C 7/24; F05D 2220/32; F05D 2240/50; F05D 2260/231; F05D 2260/602; F05D 2260/98
See application file for complete search history.

(56) References Cited

U.S. PATENT DOCUMENTS

| | | | | |
|---|---|---|---|---|
| 3,527,054 | A * | 9/1970 | Hemsworth | F01D 11/04 184/6.11 |
| 4,046,223 | A * | 9/1977 | McHugh | F01D 25/125 184/104.3 |
| 4,245,951 | A * | 1/1981 | Minnich | F01D 9/065 415/139 |
| 4,254,618 | A * | 3/1981 | Elovic | F02C 7/185 60/226.1 |
| 4,304,522 | A * | 12/1981 | Newland | F01D 9/065 415/135 |
| 4,561,246 | A | 12/1985 | Hovan | |
| 4,979,872 | A * | 12/1990 | Myers | F01D 9/065 403/131 |
| 5,160,251 | A * | 11/1992 | Ciokajlo | F01D 25/162 415/142 |
| 5,226,788 | A * | 7/1993 | Fledderjohn | F01D 5/066 411/84 |
| 5,269,133 | A * | 12/1993 | Wallace | F02C 7/185 165/142 |
| 5,564,896 | A * | 10/1996 | Beeck | F01D 11/04 415/112 |
| 6,099,165 | A | 8/2000 | Tremaine | |
| 6,134,880 | A * | 10/2000 | Yoshinaka | F02C 7/143 60/226.1 |
| 6,443,698 | B1 * | 9/2002 | Corattiyil | F01D 25/16 384/581 |
| 6,540,483 | B2 * | 4/2003 | Allmon | F01D 25/16 384/581 |
| 7,252,476 | B2 * | 8/2007 | Prestel | F01D 25/08 415/111 |
| 7,748,209 | B1 * | 7/2010 | Schopf | F01D 5/082 60/39.08 |
| 7,828,513 | B2 * | 11/2010 | Durocher | F01D 11/001 415/111 |
| 8,240,974 | B2 * | 8/2012 | Nyamu | F01D 5/084 415/1 |
| 8,967,944 | B2 * | 3/2015 | Suciu | F01D 25/125 415/1 |
| 2005/0022530 | A1 | 2/2005 | Belsom et al. | |
| 2005/0199445 | A1 | 9/2005 | Zalewski et al. | |
| 2006/0123795 | A1 | 6/2006 | Fish et al. | |
| 2012/0204569 | A1 | 8/2012 | Schubert | |
| 2014/0260321 | A1 * | 9/2014 | McClellan, IV | F01D 25/162 60/796 |
| 2016/0003161 | A1 * | 1/2016 | Grogg | F01D 25/162 415/177 |
| 2016/0032771 | A1 * | 2/2016 | Vdoviak, Jr. | F02C 7/06 277/358 |
| 2016/0032780 | A1 * | 2/2016 | Grogg | F01D 25/162 415/177 |
| 2016/0238075 | A1 * | 8/2016 | Clark | F16C 33/6677 |
| 2016/0238135 | A1 * | 8/2016 | Clark | F01D 25/18 |

FOREIGN PATENT DOCUMENTS

| | | |
|---|---|---|
| WO | 0022281 A1 | 4/2000 |
| WO | 2013162982 A1 | 10/2013 |

* cited by examiner

HEATSHIELD DISCOURAGER SEAL FOR A GAS TURBINE ENGINE

This application claims priority to U.S. Patent Appln. No. 61/783,063 filed Mar. 14, 2013.

BACKGROUND

The present disclosure relates to a gas turbine engine and, more particularly, to a heat shield arrangement therefor.

One purpose of a gas turbine engine turbine exhaust case (TEC) is to support a bearing compartment and the bearings contained therein that rotatably support the engine shafts. Typically, the TEC includes a multiple of hollow struts which support a pair of concentric rings relative to each other. The rings define inner and outer boundaries of the engine gas path while the struts are disposed across the gas path. Tie rods support the bearing housing and pass through the hollow struts to interconnect an engine mount ring and the bearing compartment. At least some of the hollow struts support oil supply and oil scavenge service lines to communicate oil to and from the bearing compartment.

In some engine architectures, the bearing compartment is surrounded by a heat shield, but with openings proximate the service lines to permit installation of the heat shield. Although effective, these opening permit some high temperature thermal transfer to the oil-wetted bearing compartment which may increase the engine heat load.

SUMMARY

A gas turbine engine according to one disclosed non-limiting embodiment of the present disclosure includes a service line interface to define a gapped overlap that at least partially supports a heat shield.

A further embodiment of the present disclosure includes, wherein said service line interface includes a service post that extends from said bearing support and a flanged mount mountable to said service post to trap a heat shield there between.

In a further embodiment of the present disclosure, the service post defines a passage.

In a further embodiment of the present disclosure, the passage communicates with an oil spray nozzle.

In a further embodiment of the present disclosure, the oil spray nozzle is integrally framed into said bearing support In a further embodiment of the present disclosure, the heat shield is trapped within a gapped interface between said service post and said flanged mount.

In a further embodiment of the present disclosure, the heat shield is trapped within said gapped overlap.

In a further embodiment of the present disclosure, said gapped overlap provides a gap with respect to an opening in said heat shield.

A further embodiment of the present disclosure further includes an insulation sleeve mounted at an interface between a service line and said flanged mount.

In a further embodiment of the present disclosure, the service line is an oil supply line.

In a further embodiment of the present disclosure, the service line is an oil scavenge line.

A method of mounting a heat shield to a gas turbine engine according to one disclosed non-limiting embodiment of the present disclosure includes trapping a heat shield within a gapped overlap spaced from an outer surface of a bearing support.

A further embodiment of the present disclosure includes spacing the heat shield from an outer surface of the bearing support.

A further embodiment of the present disclosure includes mounting a flanged mount to a service post that extends from the bearing support to define the gapped interface.

A further embodiment of the present disclosure includes defining a passage through the service post.

A further embodiment of the present disclosure includes communicating with an oil spray nozzle through the service post.

A further embodiment of the present disclosure includes blocking a line of sight to a compartment within the heat shield.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
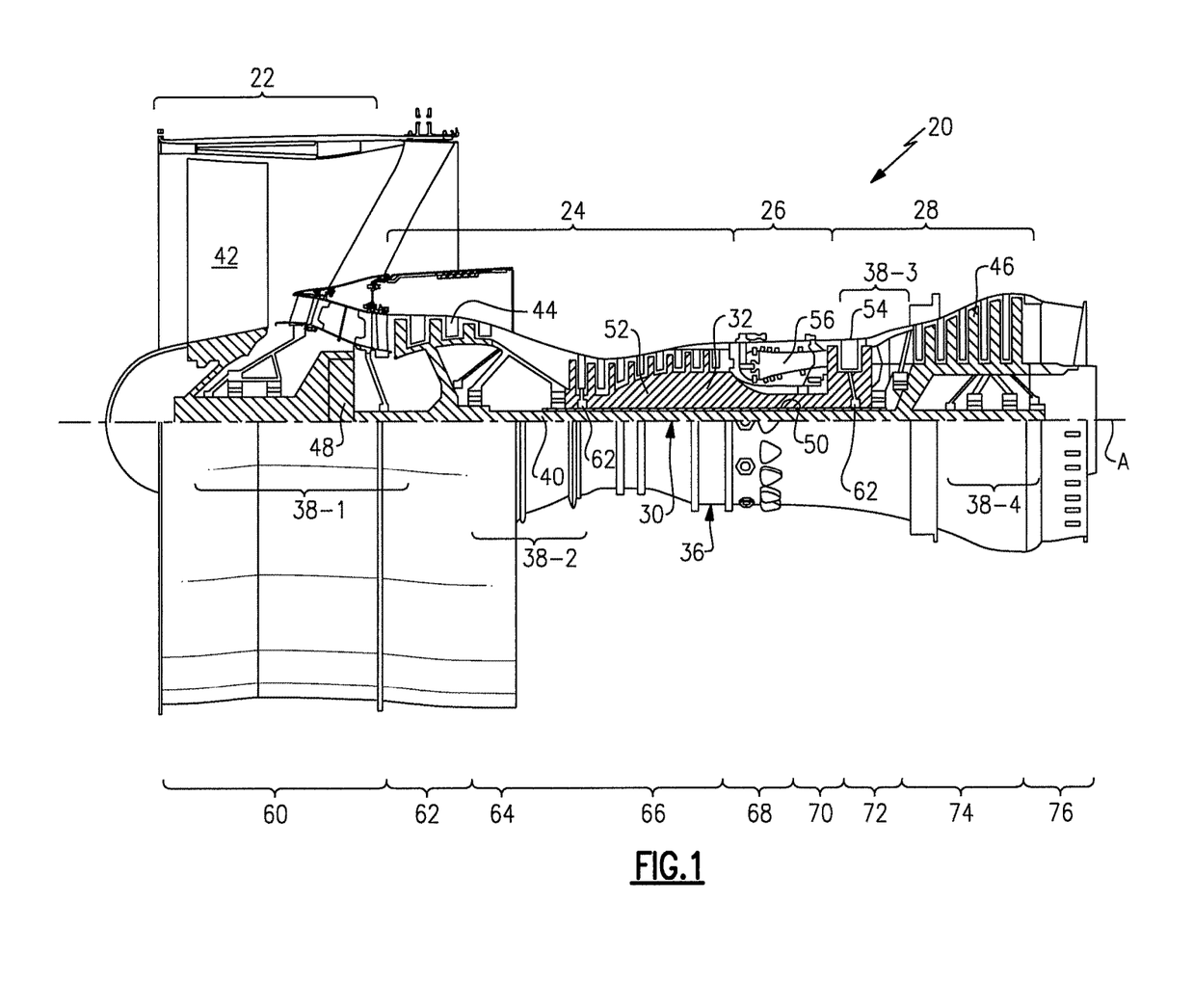
FIG. 1 is a schematic cross-sectional view of a geared architecture gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines architectures such as a low-bypass turbofan may include an augmentor section (not shown) among other systems or features. Although schematically illustrated as a turbofan in the disclosed non-limiting embodiment, it should be understood that the concepts described herein are not limited to use with turbofans as the teachings may be applied to other types of turbine engines to include but not limited to a three-spool (plus fan) engine wherein an intermediate spool includes an intermediate pressure compressor (IPC) between a low pressure compressor and a high pressure compressor with an intermediate pressure turbine (IPT) between a high pressure turbine and a low pressure turbine as well as other engine architectures such as turbojets, turboshafts, open rotors and industrial gas turbines.

The fan section 22 drives air along a bypass flowpath and a core flowpath while the compressor section 24 drives air along the core flowpath for compression and communication into the combustor section 26 then expansion through the turbine section 28. The engine 20 generally includes a low spool 30 and a high spool 32 mounted for rotation about an engine central longitudinal axis A relative to an engine case assembly 36 via several bearing compartments 38.

The low spool 30 generally includes an inner shaft 40 that interconnects a fan 42, a low-pressure compressor 44 ("LPC") and a low-pressure turbine 46 ("LPT"). The inner shaft 40 drives the fan 42 through a geared architecture 48 to drive the fan 42 at a lower speed than the low spool 30. The high spool 32 includes an outer shaft 50 that interconnects a high-pressure compressor 52 ("HPC") and high-pressure turbine 54 ("HPT"). A combustor 56 is arranged between the HPC 52 and the HPT 54. The inner shaft 40 and the outer shaft 50 are concentric and rotate about the engine central longitudinal axis "A" that is collinear with their longitudinal axes.

Core airflow is compressed by the LPC 44 then the HPC 52, mixed with the fuel and burned in the combustor 56, then expanded over the HPT 54 and the LPT 46. The HPT 54 and the LPT 46 drive the respective low spool 30 and high spool 32 in response to the expansion.

In one example, the gas turbine engine 20 is a high-bypass geared architecture engine in which the bypass ratio is greater than about six (6:1). The geared architecture 48 can include an epicyclic gear system 58, such as a planetary gear system, star gear system or other system. The example epicyclic gear train has a gear reduction ratio of greater than about 2.3, and in another example is greater than about 2.5 with a gear system efficiency greater than approximately 98%. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one non-limiting embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
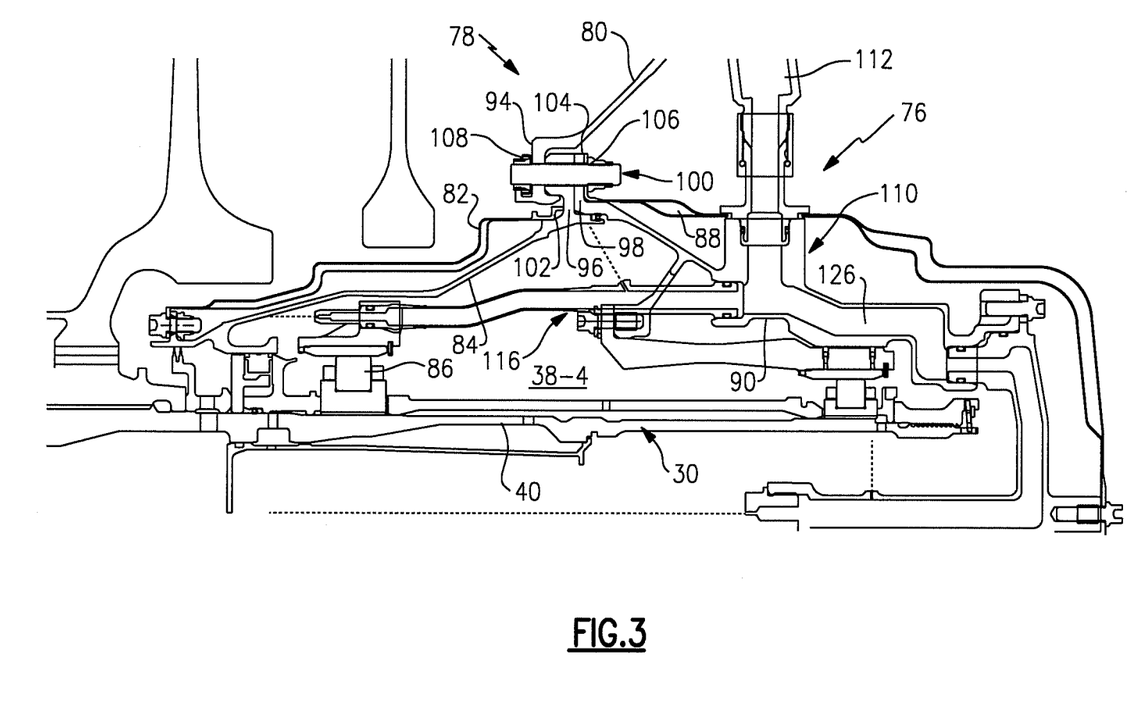
FIG. 3 is an expanded longitudinal sectional view of a bearing compartment.

The engine case assembly 36 generally includes a multiple of modules to include a fan case module 60, an intermediate case module 62, an LPC module 64, a HPC module 66, a diffuser module 68, a HPT module 70, a mid-turbine frame (MTF) module 72, a LPT module 74, and a Turbine Exhaust Case (TEC) module 76 (FIG. 3). It should be understood that additional or alternative modules might be utilized to form the engine case assembly 36.

The bearing compartments 38 in the disclosed non-limiting embodiment are defined herein as a forward bearing compartment 38-1, a mid-bearing compartment 38-2 axially aft of the forward bearing compartment 38-1, a mid-turbine bearing compartment 38-3 axially aft of the mid-bearing compartment 38-2 and a rear bearing compartment 38-4 axially aft of the mid-turbine bearing compartment 38-3. It should be appreciated that additional or alternative bearing compartments may be provided.

Figure 4:
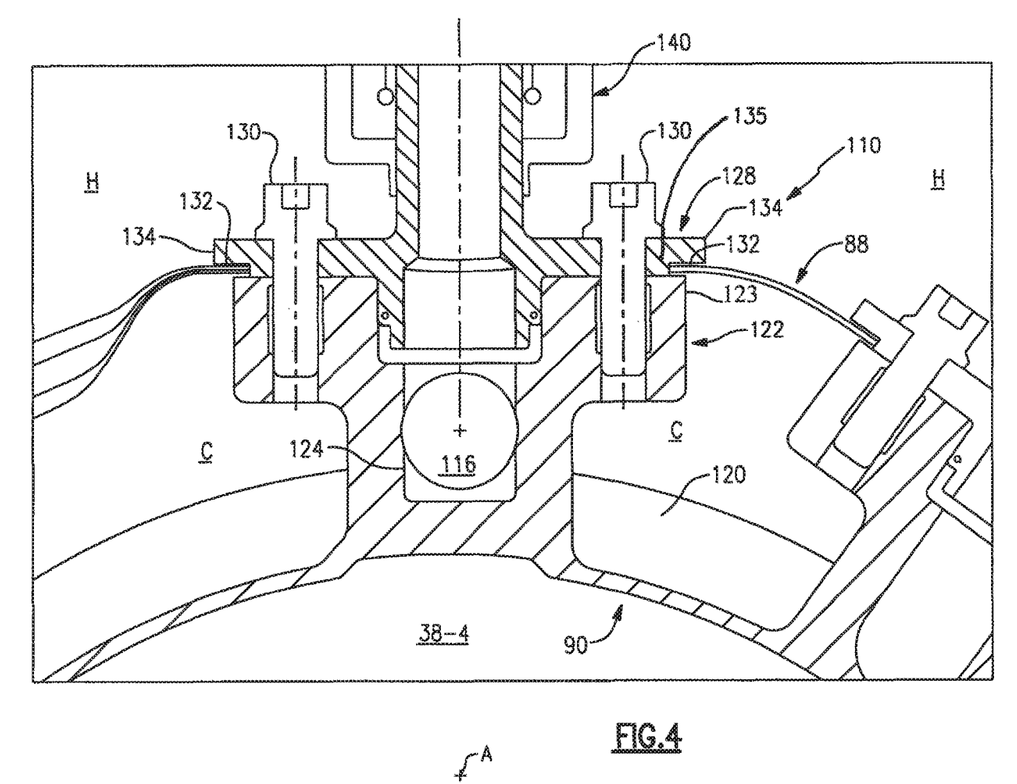
FIG. 4 is an expanded lateral sectional view of the bearing compartment.

With reference to FIG. 4, the TEC module 76 generally includes a case 80, a forward heat shield 82, a forward bearing support 84, a forward bearing 86, an aft heat shield 88, an aft bearing support 90 and an aft bearing 92. The forward bearing 86 and the aft bearing 92 are, in the disclosed non-limiting embodiment, the #5 and #6 bearing within the rear bearing compartment 38-4 to support the inner shaft 40 of the low spool 30. It should be appreciated, however, that various bearing compartments will benefit herefrom.

A flange stack 78 generally includes a case flange 94 of the case 80 secured to a forward flange 96 of the forward bearing support 84 and an aft flange 98 of the aft bearing support 90 by a fastener assembly 100. A flange 102 of the forward heat shield 82 and a flange 104 of the aft heat shield 88 may also be secured by the fastener assembly 100 that includes, for example, a bolt 106 and a nut 108. It should be appreciated that numerous fastener assemblies 100 may be utilized about the circumference of the circular flanges 94, 96, 98, 102, 104.

The aft bearing support 90 includes a multiple of service line interfaces 110 (one shown) aft of the flange stack 78. The service line interface 110 provides for a service line 112 such as an oil supply conduit 114 which, for example, communicates oil to an oil spray nozzle 116 within the bearing compartment 38-4. It should be appreciated that other service line interfaces for other service lines such as an oil scavenge line will also benefit herefrom.

With reference to FIG. 3, the service line interface 110 extends from an outer surface 120 of the aft bearing support 90 such that the aft heat shield 88 is spaced therefrom to separate the relatively hot air compartment H outside the aft heat shield 88 from the cooler static air compartment C between the aft heat shield 88 and the aft bearing support 90.

Figure 2:
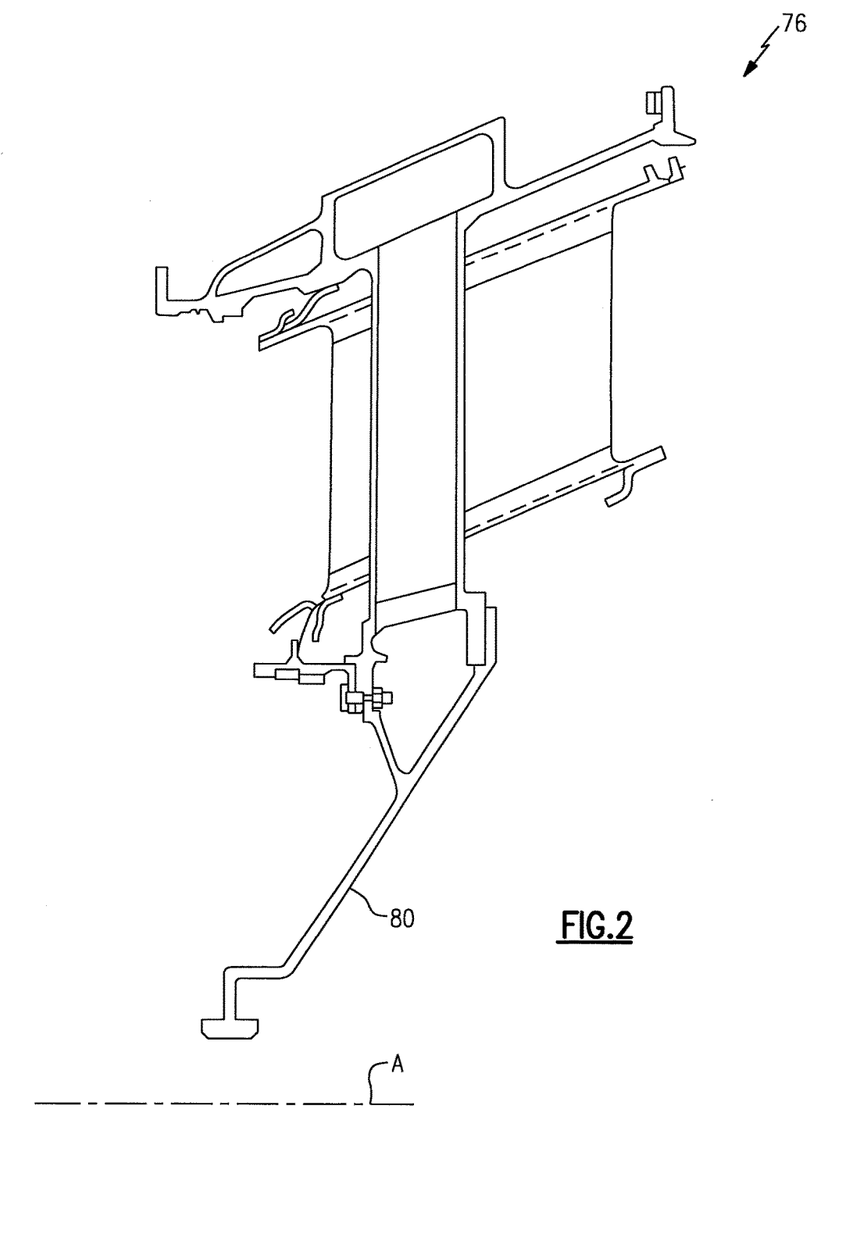
FIG. 2 is a schematic view of a turbine exhaust case module.

The service line interface 110 generally includes a service post 122 with a passage 124. The service post 122 extends from the outer surface 120 for a radial distance that is generally equivalent to the spacing between the outer surface 120 of the aft bearing support 90 and the aft heat shield 88. The passage 124 may communicate with the oil spray nozzle 116. It should be appreciated that the passage 124 and the oil spray nozzle 116 may be integrally formed into aft bearing support 90 and include a change in direction 126 (also shown in FIG. 2).

Figure 5:
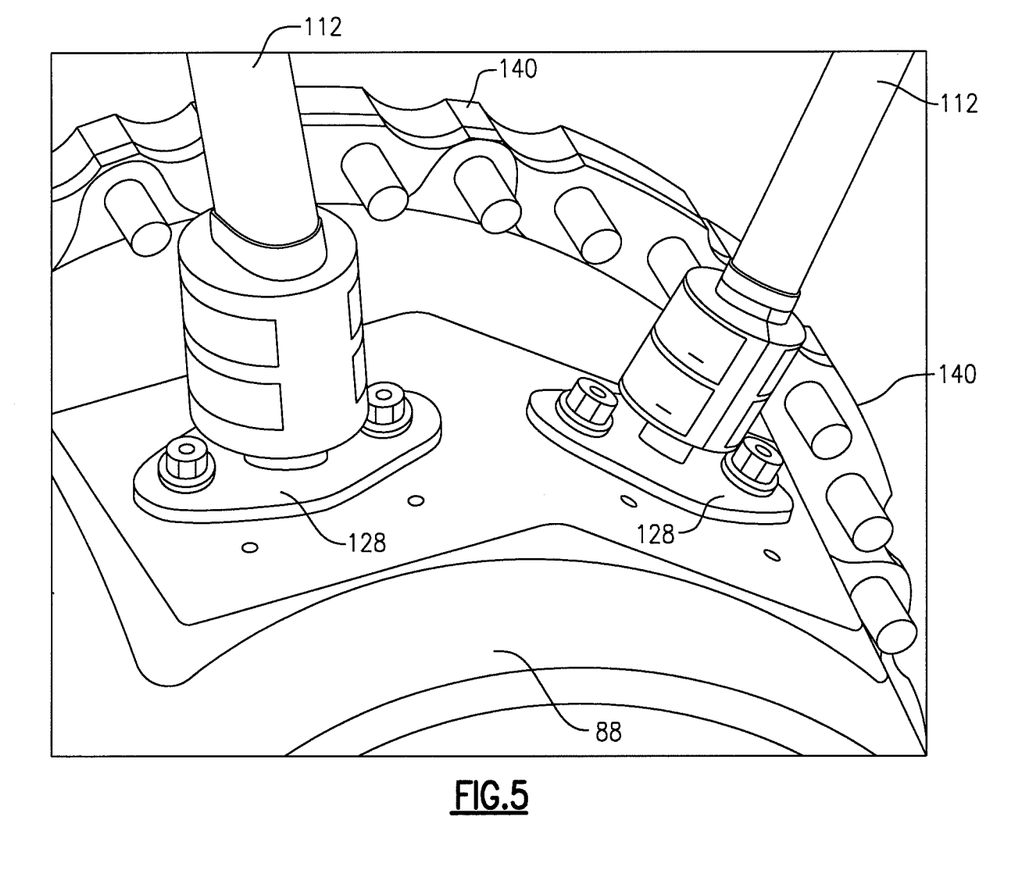
FIG. 5 is an expanded perspective view of the bearing compartment.

A flanged mount 128 is mountable to the service post 122 at a service post flange 123 with one or more fasteners 130 (two shown also in FIG. 4). A gapped overlap 132 is defined between a flange 134 of the flanged mount 128 and the service post flange 123 to receive an opening 136 in the aft heat shield 88. That is, the aft heat shield 88 is of a full hoop configuration with relatively small openings 135 for the gapped overlap 132. This allows the aft heat shield 88 to assemble from the rear of the engine 20 without interference with the mount locations for the flanged mount 128 (FIG. 5). The flange 134 of the flanged mount 128 blocks a line-of-sight to the cooler static air compartment C within the aft heat shield 88.

The gapped overlap 132 provides a gap for the opening 135 in the aft heat shield 88 to accommodate tolerances and thermal growth without binding. This gap is small enough to operate as a discourager seal across the heat shield 88. That is, the opening 135 in the aft heat shield 88 is smaller than the flange 134 but is larger than a periphery of the gapped overlap 132 to permit some relative movement of the aft heat shield 88 due to thermal expansion and contraction without the potential to bind.

With reference to FIG. 5, an insulation sleeve 140 is mounted at the interface between the service line 112 and the flanged mount 128. The insulation sleeve 140 may extend for a length between the aft heat shield 88 and an inner periphery (not shown) of the case 80. That is, the insulation sleeve 140 extends across the relatively hot air compartment H.

Figure 6:
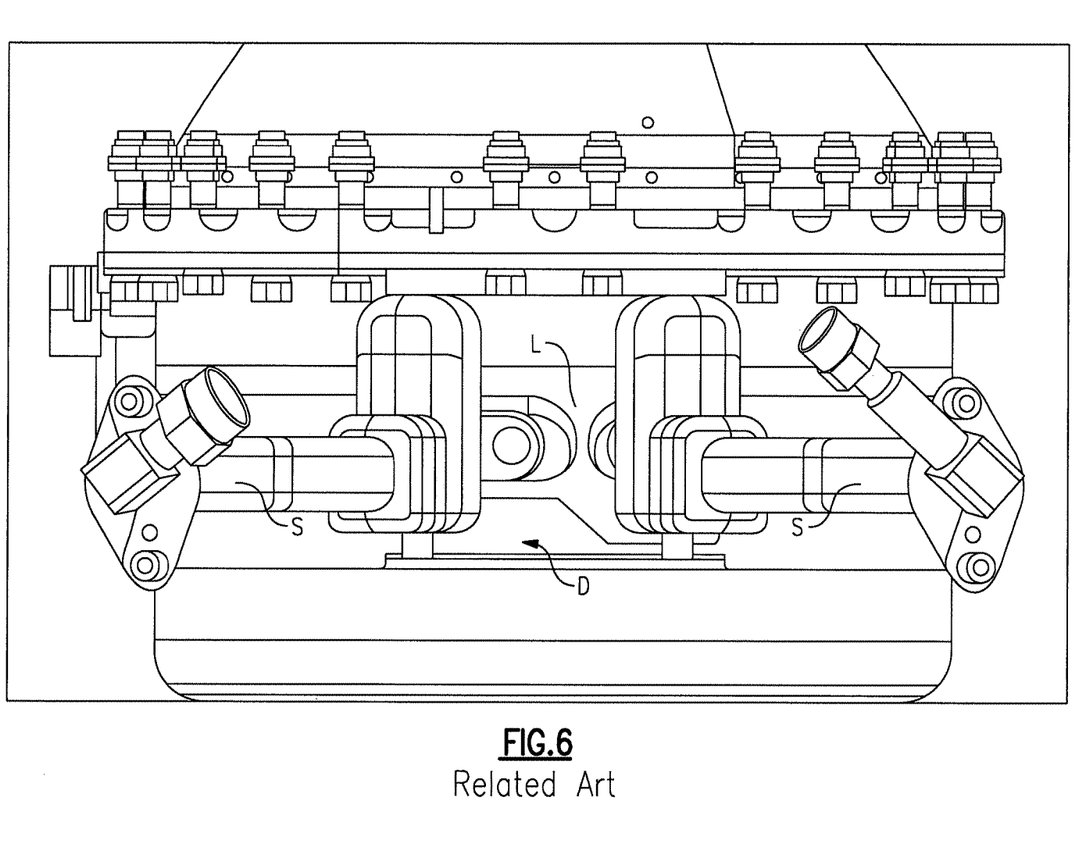
FIG. 6 is an expanded perspective view of a RELATED ART bearing compartment.

The relatively hot air compartment H outside the aft heat shield 88 is nearly stagnant so an air-tight seal is not required at the insulation sleeve 140, but is nonetheless a generally dead air cavity that operates as thermal insulation from the relatively higher core airflow temperatures. Conventional heat shield designs do not provide sealing around the service lines S that attach to the bearing compartment and leave a relatively large opening L which do not provide complete local thermal protection of (FIG. 6; RELATED ART).

The service line interface 110 facilitates an effective seal to reduce the heat-load on the oil system by more complete separation between the relatively hot air compartment H and the relatively cooler static air compartment C inside the aft heat shield 88. Since the aft heat shield 88 installs over the service post 122 (instead of around; FIG. 5; RELATED ART), the mounting flange is full circumference which significantly reduces stress on the aft heat shield 88. The conventional split flange heat shield design (FIG. 6; RELATED ART) tends to pull outward due to the thermal gradient in contrast to the service line interface 110 that permits the hoop strength of the aft heat shield 88 to accommodate the thermal gradient load. This also allows a single draw direction for sheet metal manufacture of the aft heat shield 88.

It should be appreciated that although the aft heat shield 88 is illustrated in the disclosed non-limiting embodiment, the interface can beneficially be applied to any air-to-air interfaces where a discourager provides an adequate seal.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A gas turbine engine comprising:
   a service post including a service post flange;
   a heat shield with an opening; and
   a flange mounted to said service post to trap said heat shield between said service post flange and said flange, said opening in said heat shield smaller than said flange and larger than a periphery of a gapped overlap between said service post flange and said flange to permit relative movement of said heat shield with respect to said service post.

2. The gas turbine engine as recited in claim 1, wherein said service post extends from a bearing support.

3. The gas turbine engine as recited in claim 2, wherein said service post defines a passage.

4. The gas turbine engine as recited in claim 3, wherein said passage communicates with an oil spray nozzle.

5. The gas turbine engine as recited in claim 4, wherein said oil spray nozzle is integrally formed into said bearing support.

6. The gas turbine engine as recited in claim 1, further comprising an insulation sleeve mounted to a service line that communicates with a passage through said service post.

7. The gas turbine engine as recited in claim 6, wherein said service line is an oil supply line.

8. The gas turbine engine as recited in claim 6, wherein said service line is an oil scavenge line.

9. The gas turbine engine as recited in claim 1, wherein said heat shield is installed over said service post.

10. The gas turbine engine as recited in claim 1, wherein said heat shield is of a full hoop configuration.

11. The gas turbine engine as recited in claim 1, wherein said heat shield is of a full hoop configuration installed over said service post.

12. A method of mounting a heat shield to a gas turbine engine comprising:
   mounting a flange to a service post flange of a service post that extends from a bearing support to define a gapped overlap, to trap a heat shield within the gapped overlap to space the heat shield from an outer surface of the bearing support, an opening in said heat shield smaller than said flange and larger than a periphery of the gapped overlap to permit relative movement of said heat shield.

13. The method as recited in claim 12, further comprising: providing for communication with an oil spray nozzle through the service post.

14. The method as recited in claim 12, further comprising: blocking a line of sight to a compartment within the heat shield.

15. The method as recited in claim 12, further comprising: installing the heat shield over the service post.

16. A gas turbine engine comprising:
a bearing support;
a service post that extends from said bearing support;
a heat shield with an opening; and
a flange mounted to said service post to trap said heat shield between said service post and said flange, said opening in said heat shield smaller than said flange and larger than a periphery of a gapped overlap between said service post and said flange.

17. The gas turbine engine as recited in claim 16, wherein said heat shield is installed over said service post.

18. The gas turbine engine as recited in claim 16, wherein said heat shield is of a full hoop configuration.

* * * * *